United States Patent [19]

Bannai

[11] Patent Number: 4,963,996
[45] Date of Patent: Oct. 16, 1990

[54] IMAGE READER/EDITOR WITH OPERATOR INTERACTION

[75] Inventor: Yuichi Bannai, Tokyo, Japan

[73] Assignee: Canon Kabushiki Kaisha, Tokyo, Japan

[21] Appl. No.: 138,442

[22] Filed: Dec. 23, 1987

Related U.S. Application Data

[60] Division of Ser. No. 30,293, Mar. 23, 1987, Pat. No. 4,761,818, which is a continuation of Ser. No. 596,833, Apr. 4, 1984, abandoned.

[30] Foreign Application Priority Data

Apr. 8, 1983 [JP] Japan .................................. 58-60951
Apr. 8, 1983 [JP] Japan .................................. 58-60953
Jun. 20, 1983 [JP] Japan ................................. 58-109426
Jun. 20, 1983 [JP] Japan ................................. 58-109427

[51] Int. Cl.$^5$ ............................................. G06K 9/20
[52] U.S. Cl. ..................................... 358/453; 382/48; 382/61
[58] Field of Search ..................... 382/58, 61, 65, 45, 382/48, 58, 61, 65; 358/453, 450

[56] References Cited

U.S. PATENT DOCUMENTS

| | | | |
|---|---|---|---|
| 3,529,084 | 9/1970 | Rich | 382/60 |
| 3,671,941 | 6/1972 | Takahashi et al. | 382/60 |
| 4,138,662 | 2/1979 | Shimoyama | 382/61 |
| 4,272,756 | 6/1981 | Kakumoto et al. | 382/67 |
| 4,493,108 | 1/1985 | Fryer et al. | 382/48 |
| 4,623,935 | 11/1986 | Mukai | 382/48 |

FOREIGN PATENT DOCUMENTS 60-156187  1/1984  Japan .................................. 382/58

Primary Examiner—Leo H. Boudreau
Assistant Examiner—Michael R. Cammarata
Attorney, Agent, or Firm—Fitzpatrick, Cella, Harper & Scinto

[57] ABSTRACT

An image reading apparatus is disclosed which allows manual designation of the area to be read. This scanner accepts operator input to position the read head prior to actual scanning. Start and end positions are determined and then stored. The apparatus also displays characters and images such that images stored in memory can be displayed by identification codes in the same manner as characters.

5 Claims, 17 Drawing Sheets

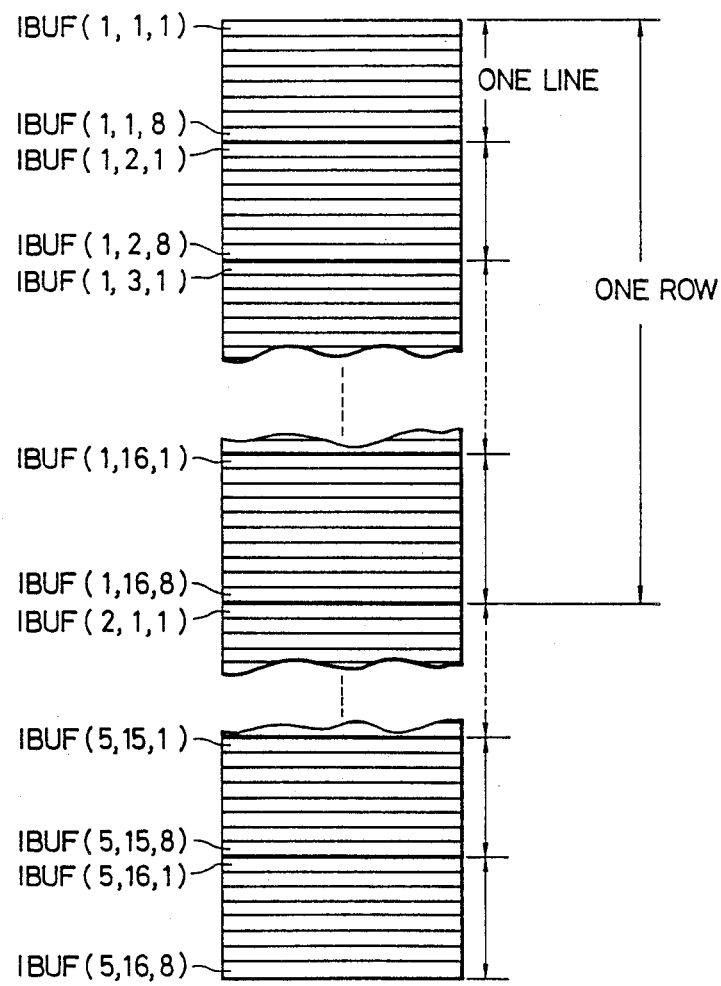
FIG. 3A
FIG. 3B
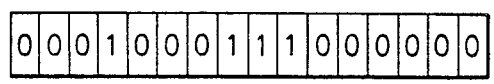

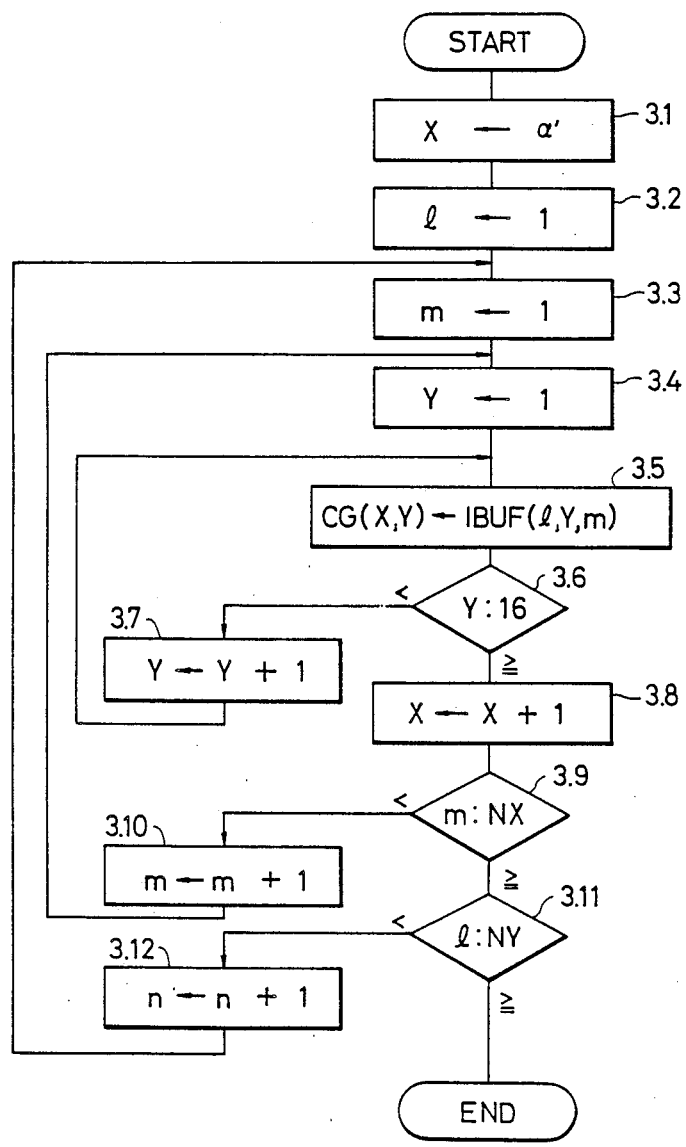

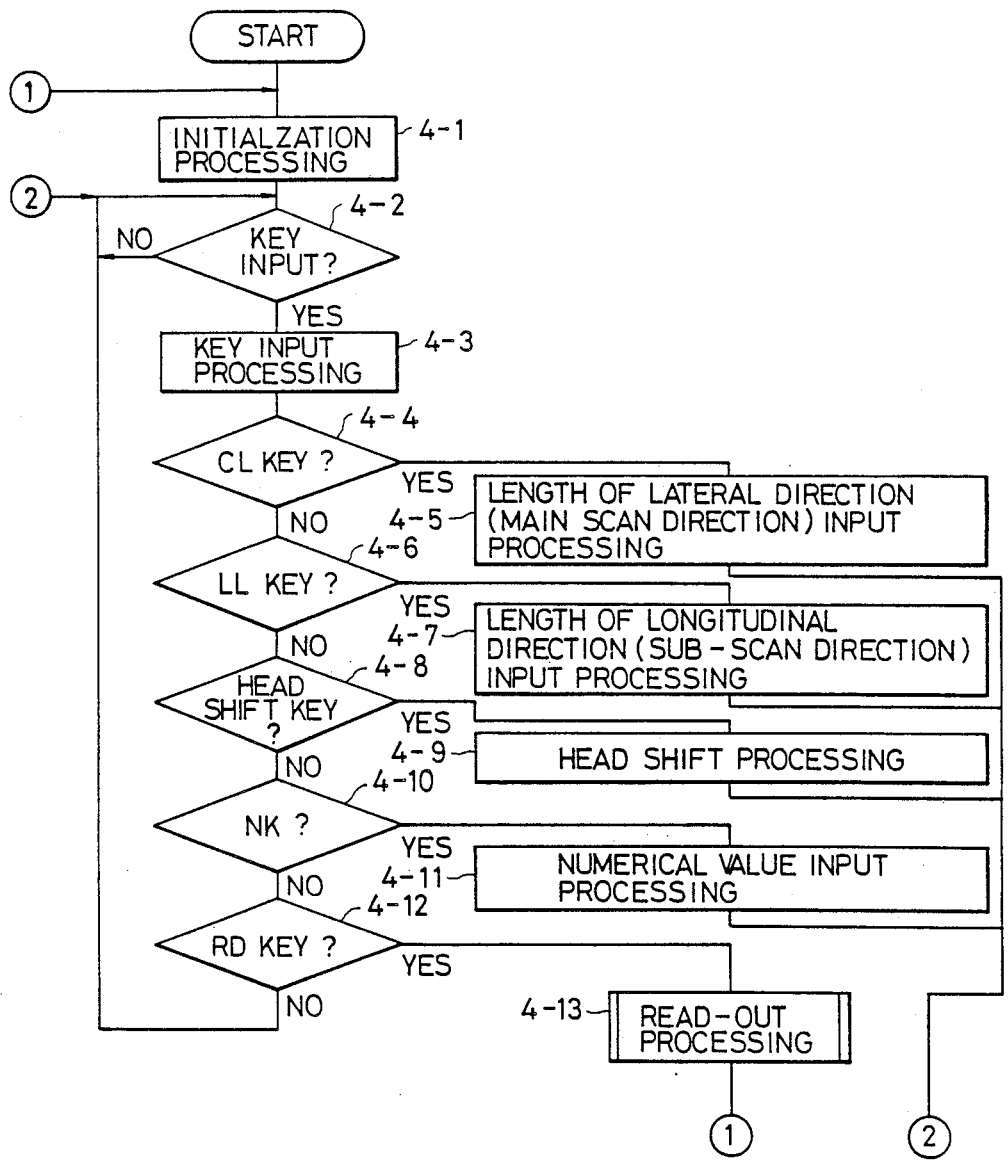

IMAGE READER/EDITOR WITH OPERATOR INTERACTION

This is a division of application Ser. No. 030,293, filed Mar. 23, 1987, now U.S. Pat. No. 4,761,818, which is a continuation of prior application Ser. No. 596,833, filed Apr. 4, 1984, abandoned.

BACKGROUND OF THE INVENTION

1. Field of the Invention

The present invention relates to an information processing apparatus capable of handling images.

2. Description of the Prior Art

In conventional display apparatus designed principally for character display, the positions of character display are predetermined, for example 40 characters by 16 lines, and the position of a character is determined by moving a cursor.

On the other hand, in the display apparatus principally designed for image display, the display screen is divided for example into 400 and 800 sections respectively in the vertical and horizontal directions, and the image display is achieved by allotting each pixel of the image to each of such divided areas. Also the area to be displayed or to be subjected to image processing is designated in the unit of pixels for example with a joy stick coupler. Such method is not only difficult to handle for controlling the display but also requires a complicated and thus expensive circuit for control, in comparison with the above-described display apparatus designed principally for character display. Also exact designation of positions is not easy for the operator, since the display screen is very finely divided as explained above.

The conventional processing apparatus designed for processing both character data and image data usually employ the latter method principally designed for image display. In such apparatus the operations for characters and those for images are achieved by changing the operating modes. Consequently in case of confirming an identification code for an image contained in a document during a character editing characters, there has been required a complicated operation such as switching from the character editing mode to the image editing mode, or calling an image frame different from that for character editing.

The present invention further relates to an image reading apparatus for image reading by scanning motion of an image reading head. As is already known for example in the facsimile apparatus, the conventional apparatus of this kind are designed to read an entire original containing an image to be read.

On the other hand, in conventional apparatus capable of reading an image by designating a part of the original, the position and dimension of the image to be read are designated by numerals. Otherwise appropriate marks indicating the area of image to be read are inscribed in the original, and the desired image area is read by detecting the marks at the image reading. However the former method is defective in that a desired area of the original can only be read if the operator measures the position and the dimension of the image beforehand and if the original is exactly set on the reading apparatus. On the other hand the latter method is defective in that the apparatus becomes inevitably expensive because of the mechanism for detecting the marks indicating the image to be read, and still possibility of erroneous detection is unavoidable.

SUMMARY OF THE INVENTION

In consideration of the foregoing, an object of the present invention is to provide a method of designating character and image, utilizing the conventional method principally for characters but allowing simple and inexpensive control and processing of character and image information.

Another object of the present invention is to provide a method of designating character and image, enabling the operator to easily designate the image position.

Still another object of the present invention is to provide a character and image processing apparatus capable of processing characters and images by a conventional method principally designed for character display, thereby enabling character editing and image editing without switching of operating modes and further enabling image identifying information with a simple operation.

Still another object of the present invention is to provide an image reading apparatus allowing to designate the area to be read in an original in an extremely simple and precise manner. This object is achieved according to the present invention, in an image reading apparatus in which the scanning at image reading is conducted by movement of a reading head, by designating one of end points contained in the image area to be read by the movement of the reading head. Also the object is achieved, in an image reading apparatus in which the main scanning is conducted by movement of a reading head while the subsidiary scanning is conducted by movement of the original to be read, by designating, through the movement of the reading head, two diagonal end points of a rectangular area to be read.

BRIEF DESCRIPTION OF THE DRAWINGS

FIG. 3A is a schematic view showing an image buffer memory IBUF;

FIG. 3B is a schematic view showing the content of one word thereof;

FIG. 7 is a flow chart showing the process control for data transmission;

FIG. 20 is a flow chart showing the process flow in an image reading apparatus of the present invention;

DETAILED DESCRIPTION OF THE PREFERRED EMBODIMENTS

Now the present invention will be clarified in detail by embodiments thereof shown in the attached drawings.

Figure 1:
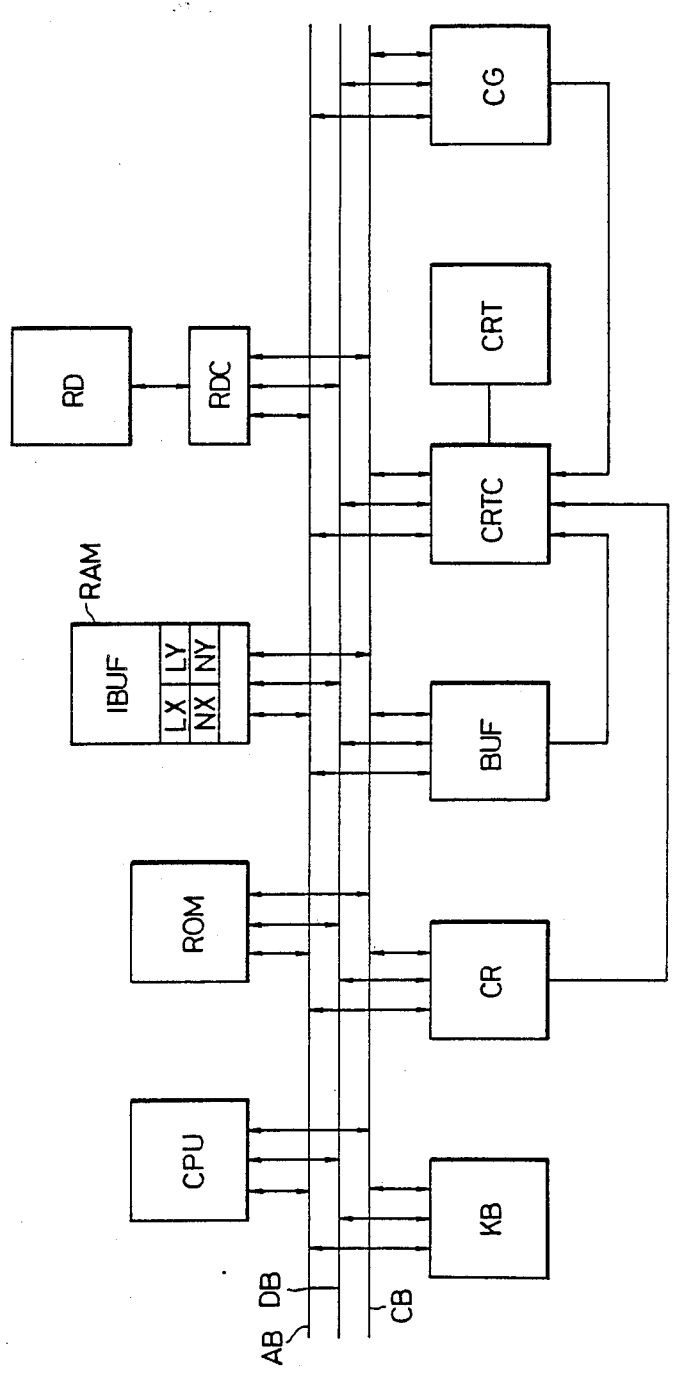
FIG. 1 is a block diagram of an embodiment of the present invention.
Figure 6:
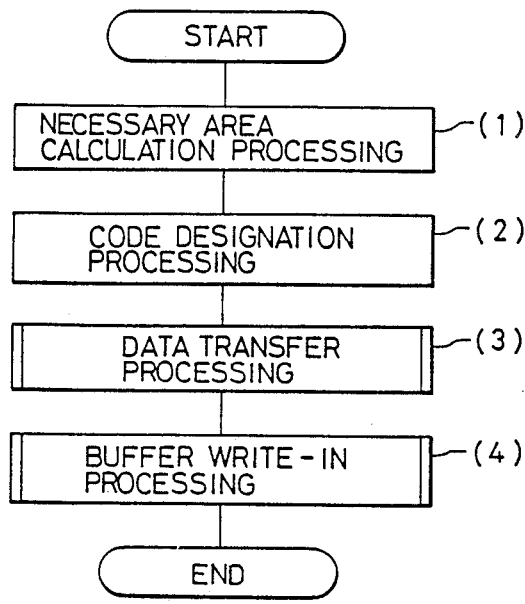
FIG. 6 is a flow chart showing the process control for combining an image with a document in the present embodiment.

FIG. 1 shows an embodiment of a character and image processing apparatus of the present invention, wherein shown are a microprocessor CPU for arithmetic and logic calculations and for controlling buses AB, CB, DB to be explained later; an address bus AB for transmitting signals for designating objects of control; a control bus CB for supplying control signals to various objects of control; a data bus DB for transmitting various data; a control read-only memory ROM for storing programs of control for example programs shown in FIGS. 6, 7 and 9; a random access memory RAM to be used for temporarily storing various data and as a working memory in the arithmetic and logic calculations in the microprocessor CPU; and a keyboard KB for entering characters to be read by the microprocessor CPU.

Figure 2:
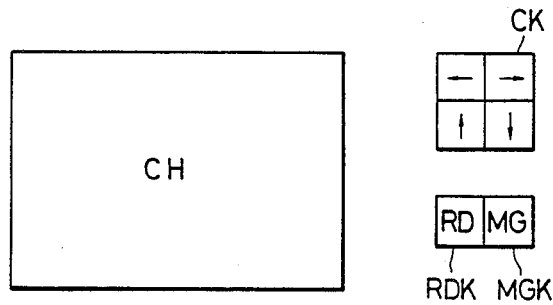
FIG. 2 is a schematic view showing key arrangement of a keyboard to be employed therein.

FIG. 2 shows the detailed of the keyboard KB equipped with a character key group CH and a function key group. The character key group CH is for example composed of a keyboard of the Japanese Industrial I Standard and allows entry of alphabets, numerals and Japanese phonetic characters. The function key group consists of a cursor moving key group CK, an image reading designation key RDK, and an image-document merging key MGK.

Again referring to FIG. 1, a cursor register CR1 stores the position of a cursor to be displayed on a display screen of a display apparatus to be explained later, and has a capacity of 2 words respectively storing the number of row and the number of column. The respective values of the content will be expressed by C(1, 1) and C(1, 2). A buffer memory BUF stores the data entered from the keyboard KB, and has a capacity of 8×5 words for storing the data of 5 rows ×8 columns in the form of character codes. The content of the buffer memory will be expressed by B(L, C), wherein L is an integer from 1 to 5 representing the number of line while C is an integer from 1 to 8 representing the number of columns. A character generator CG1 stores all the patterns corresponding to the character codes to be employed in the present embodiment.

Figure 8:
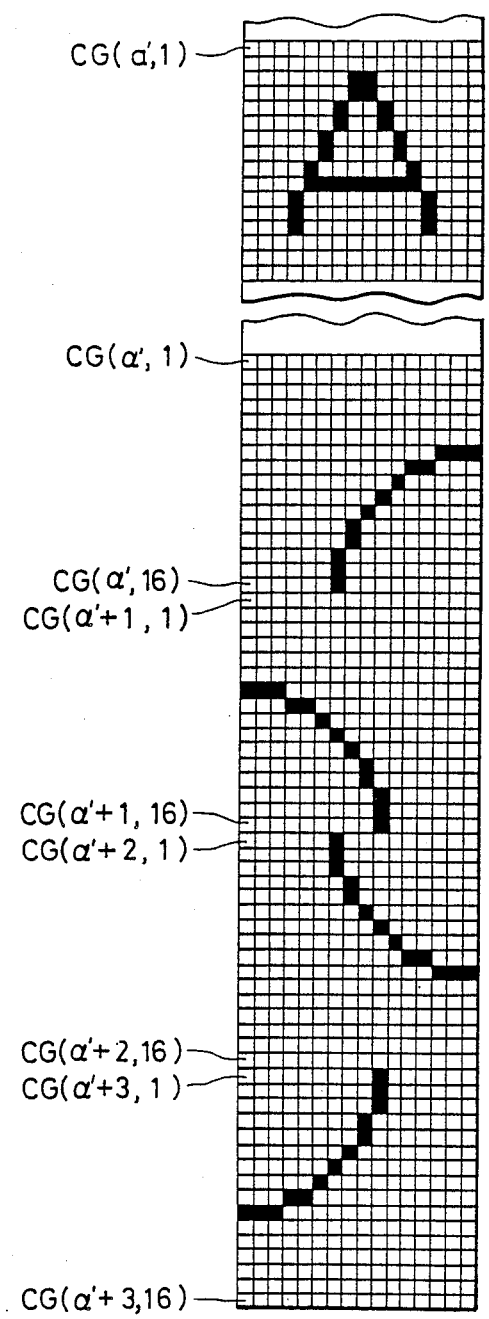
FIG. 8 is a view showing the content of a character generator CG for use in the present embodiment.

In the present embodiment a character is composed of 16 dots by 16 dots, as shown in FIG. 8. A cathode ray tube (CRT) controller CRTC displays a cursor on a display device according to the cursor data stored in the cursor register CR. It also converts character codes stored in the buffer memory BUF into pattern data by referring to the character generator CG, and displays character or symbol patterns on the display device CRT. The display on the display device CRT is conducted in a form of 5 rows × 8 columns according to the data stored in the buffer memory BUF.

An image reading unit RD reads an image under the control of an image reading controller RDC to be explained later, and is composed of a lens, a lamp, an image sensor etc. which are already known for example in the facsimile technology and are therefore not explained in detail. The image reading unit controller RDC executes the control process stored in the read-only memory ROM and transfers the image data read in the image reading unit RD to an image buffer memory area IBUF of the random access memory RAM.

FIGS. 3A and 3B show the details of the image buffer memory IBUF, which has a capacity of $5 \times 8 \times 16 = 640$ words and of which content is represented by IBUF(l, Y, m) wherein $l = 1 \sim 5, Y32\ 1 \sim 16$ and $m = 1 \sim 8$. 1 stands for the number of row, Y stands for the number of a read line, wherein 16 line constitutes a row of characters, and m stands for the number of column Thus the read image is stored in the horizontal direction, from the upper left corner of the image, in the order from IBUF(1, 1, 1) to IBUF(1, 1, 8) for the first line, then from IBUF(1, 2, 1) to IBUF(1, 2, 8) for the 2nd line, and for the 17th line from IBUF(2, 1, 1) to IBUF(2, 1, 8).

FIG. 3B shows the structure of one word of the buffer memory BUF. One word is composed of 16 bits in which "1" and "0" respectively represent black and white of a binary image.

Again referring to FIG. 1, the random access memory RAM contains a register LX for storing the number of dots in the horizontal direction of the image, and a register LY for storing the number of dots in the vertical direction of the image. For example if an image has dot numbers LX=40 and LY=50, the corresponding image data are stored in IBUF (1, 1, 1)~IBUF(1, 1, 3), IBUF(1, 2, 1)~IBUF(1, 2, 3), . . . , IBUF(1, 16, 1)~IBUF(1, 16, 3), IBUF(2, 1, 1)~IBUF(2, 1, 3), . . . , IBUF(3, 2, 1)~IBUF(3, 2, 3). Signals "0" are stored in the remaining area of the buffer memory IBUF.

Figure 4A:
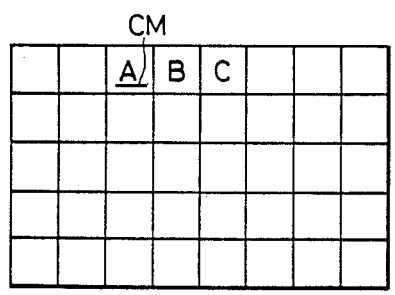
FIGS. 4A and 4B are schematic views showing contents of display.
Figure 4B:
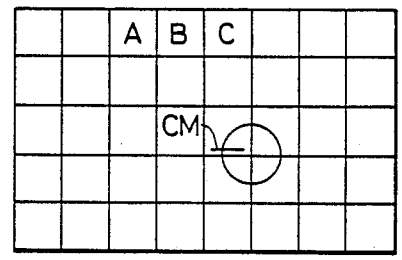

In the following there will be explained the function of the above-described embodiment, by an example of merging, after characters are entered as shown in FIG. 4A, an image read in advance by the image reading unit RD and stored in the buffer memory IBUF. Such operation is achieved by moving the cursor CM to the left-end position of the image merging area and by depressing the image merging key MGK, thus obtaining a display as shown in FIG. 4B.

The procedure of the operation will be explained detailedly in the following.

Figure 5A:
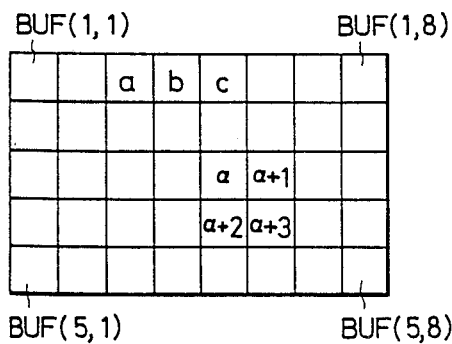
FIG. 5A is a schematic view showing the content of a buffer memory BUF.
Figure 5B:
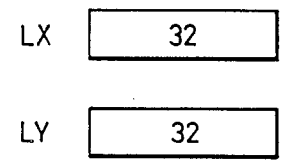
FIG. 5B is a schematic view showing the content of a vertical dot number storage register LY and a horizontal dot number storage register LX for use in the present embodiment.

After the enter of characters as shown in FIG. 4A, the buffer memory BUF stores internal codes a, b and c respectively corresponding to the characters A, B and C on the display as shown in FIG. 5A. The internal codes a, b and c have 1-to-1 correspondence with the addresses of the character generator CG, and the CRT controller CRTC calculates the addresses from the internal codes stored in the buffer memory BUF to display the patterns stored in the addresses. It is assumed that a', b' and c' represent the addresses of the character generator CG respectively corresponding to the internal codes a, b and c. Upon actuation of the image merging key MGK after the cursor CM is moved to the image merging position (cf. FIG. 4B), there are executed following steps shown in FIG. 6:

(1) Calculation of necessary area:

This step determines the area on the display screen, in terms of number of characters, required by the read image. The number (NX) of characters in the horizontal direction and the number (NY) of characters in the vertical direction are calculated from the numbers LX, LY of dots in the horizontal and vertical directions according to the following equations:

$$NX = (LX-1)/16 + 1$$

$$NY = (LY-1)/16 + 1$$

In the result of divisions, the fractional part is disregarded.

The number of characters corresponding to the area is determined by $(NX) \times (NY)$.

(2) Code designating step:

In this step a code is allotted to the number of characters determined in the step (1). $\alpha, \alpha+1, \alpha+2, \ldots$ are available as image codes for encoding in the increasing order. In case of encoding from $\alpha$, the codes to be used are $\alpha, \alpha+1, \alpha+2, \ldots, \alpha+\{(NX)\times(NY)-1\}$.

(3) Data transfer step:

This step transfer the data from the image buffer memory IBUF to the addresses of the character generator CG which have 1-to-1 correspondence with the codes allotted in the step (2). The addresses are represented as $(\alpha', 1) \sim (\alpha', 16), (\alpha+1, 1) \sim (\alpha'+1, 16), \ldots,$ and the corresponding contents are represented as $CG(\alpha', 1) \sim CG(\alpha', 16), CG(\alpha'+1, 1) \sim CG(\alpha'+1, 16), \ldots$ FIG. 7 shows a detailed process flow of the step (3), wherein steps 3.1-3.4 store initial values in exclusive registers Y, X, l and m. A step 3.5 transfer the data from a determined position of the image buffer memory IBUF to a determined position of the character generator. Then a step 3.6 compares the content of the register Y with "16", and the program proceeds to a step 3.7 or 3.8 respectively when the former is smaller or not. Similarly steps 3.9 and 3.11 respectively compare the contents of the register m and l with NX and NY. Steps 3.7, 3.8, 3.10 and 3.12 respectively increase stepwise the content of the registers Y, X, m and n.

FIG. 8 shows the content of the character generator CG transferred in the above-described data transfer step (3), wherein shown is a state of transfer of image data representing a circle of a dimension of four characters as shown in FIG. 4B.

(4) Buffer write-in step:

This step writes the code designated in the code designating step (2) into the buffer memory BUF.

Figure 9:
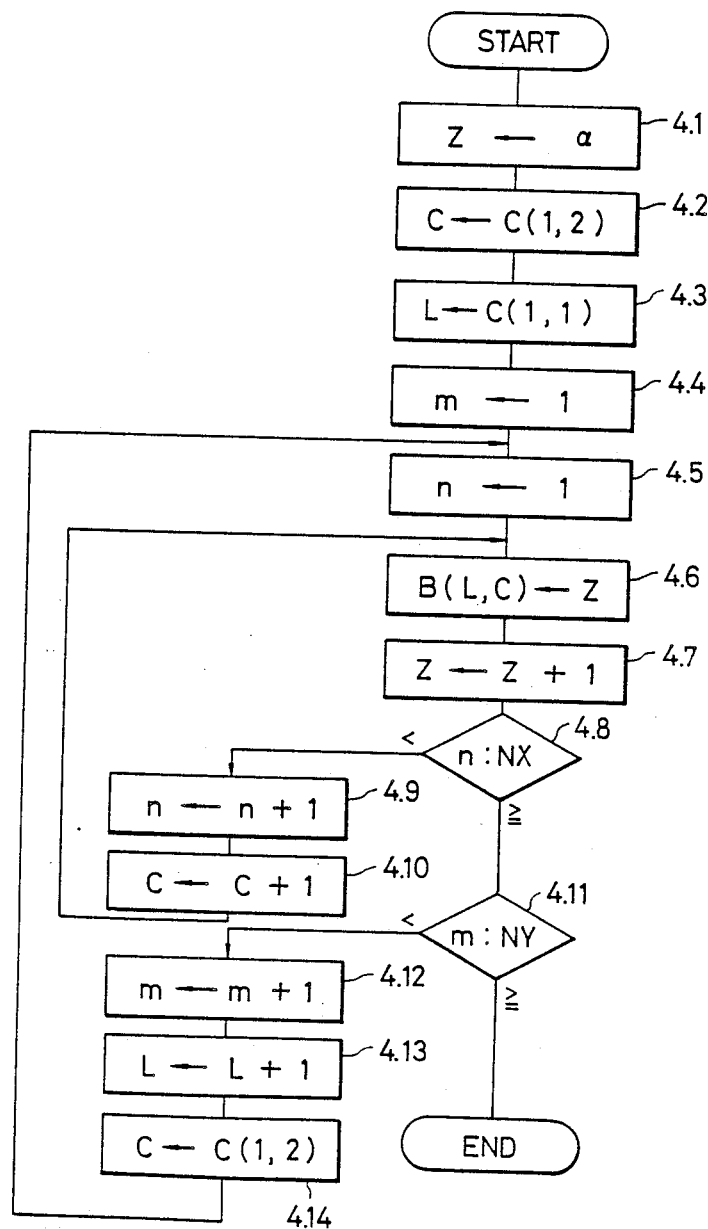
FIG. 9 is a flow chart showing the process control for buffer write-in process.

FIG. 9 shows the detailed flow of the step (4). Steps 4.1 to 4.5 store initial values into registers Z, L, C, m and n. A step 4.6 stores the value of the code stored in the register Z into the buffer at a position indicated by B(L, C). A step 4.8 compares the value of the register n with the number NX of characters in the horizontal direction, and the program proceeds to a step 4.8 or 4.10 respectively when the former is smaller or not. A step 4.11 compares the value of the register m with the number NY of characters in the vertical direction, and the program proceeds to a step 4.12 or the buffer write-in process is terminated respectively if the former is smaller or not. Steps 4.7, 4.9, 4.10, 4.12 and 4.13 respectively increase the content of the registers Z, n, C, m and L. A step 4.14 resets the value of the register C.

The process of merging an image to a document is completed in this manner, so that the buffer memory BUF stores data as shown in FIG. 5A while the character generator CG stores data as shown in FIG. 8, thereby enabling to merge an image at a desired position in the unit of characters in the document.

Though the foregoing embodiment describes a process of merging an image into a document, the present invention is naturally not limited to such case but is applicable also to editing processes for thus merged image, for example displacement or deletion of the entire image.

In the following there will be explained another embodiment of the present invention.

Figure 10:
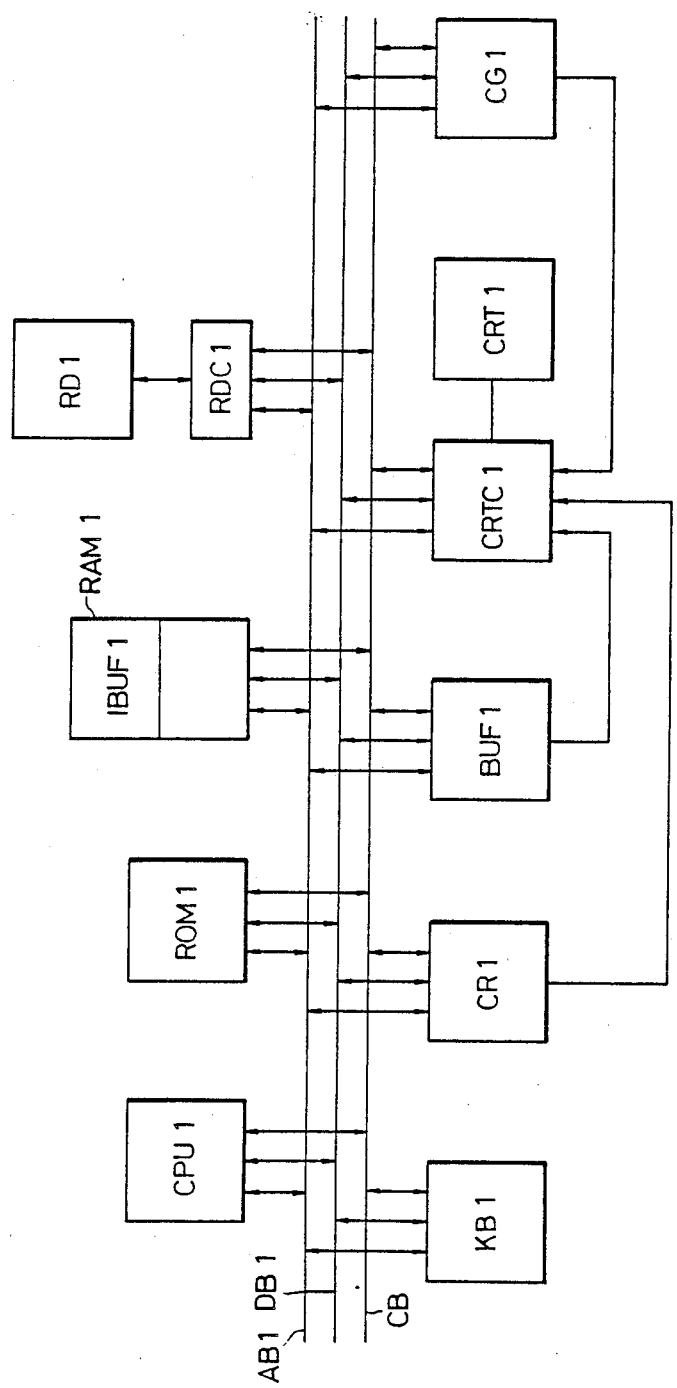
FIG. 10 is a block diagram showing another embodiment of the present invention.

FIG. 10 shows an embodiment of a character and image processing apparatus of the present invention, wherein shown are a microprocessor CPU1 for arithmetic and logic calculations and for controlling buses AB1, CB1, DB1 to be explained later; an address bus AB1 for transmitting signals for designating objects of control; a control bus CB1 for supplying control signals to various objects of control; a data bus DB1 for transmitting various data; a control read-only memory ROM1 for storing programs of control for example programs shown in FIG. 16; a random access memory RAM1 to be used for temporarily storing various data and as a working memory in the arithmetic and logic calculations in the microprocessor CPU1; and a keyboard KB for entering characters to be read by the microprocessor CPU1.

Figures 11, 13A, 13B, 14A, 14B:
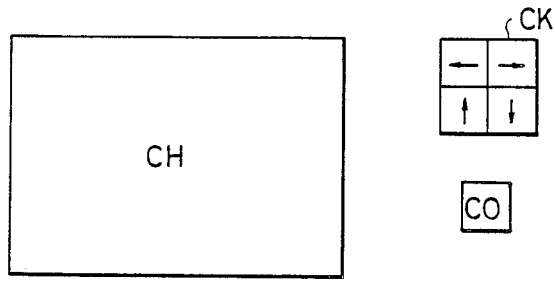
FIG. 11 is a schematic view showing the key arrangement of a keyboard to be employed therein.
FIGS. 13A, 13B, 14A and 14B are schematic views showing modes of display on a display screen.

FIG. 11 shows the details of the keyboard KB1 equipped with a character key group CH1 and a function key group. The character key group CH1 is for example composed of a keyboard of the Japanese Industrial Standard and allows entry of alphabets, numerals and Japanese phonetic characters. The function key group consists of a cursor moving key group CK1 and a code confirming key CO1.

Again referring to FIG. 10, a cursor register CR1 stores the position of a cursor to be displayed on a display screen of a display apparatus to be explained later, and has a capacity of 2 words respectively the number of row and the number of column. The respective values of the content will be expressed by C(1, 1) and C(1, 2). A buffer memory BUF1 stores the data entered from the keyboard KB, and has a capacity of $8 \times 5$ words for storing the data of 5 rows $\times 8$ columns in the form of character codes. The content of the buffer memory will be expressed by B(L, C), wherein L is an integer from 1 to 5 representing the number of line while C is an integer from 1 to 8 representing the number of column (cf. FIG. 15).

A character generator CG1 stores all the patterns corresponding to the character codes to be employed in the present embodiment. In the present embodiment a character is composed of 16 dots by 16 dots. A cathode ray tube (CRT) controller CRTC1 displays a cursor on a display device according to the cursor data stored in the cursor register CR1. It also converts character codes stored in the buffer memory FUF1 into pattern data by referring to the character generator CG1, and displays character or symbol patterns on the display device CRT1. The display on the display device CRT1 is conducted in a form of 5 rows ×8 columns according to the data stored in the buffer memory FUF1 (cf. FIG. 14).

An image reading unit RD1 reads an image under the control of an image reading controller RDC1 to be explained later, and is composed of a lens, a lamp, an image sensor etc. which are already known for example in the facsimile technology and are therefore not explained in detail. The image reading unit controller RDC1 executes the control process stored in the read-only memory ROM1 and transfers the image data read in the image reading unit RD1 to an image buffer memory area IFUF1 of the random access memory RAM1.

Figure 12A:
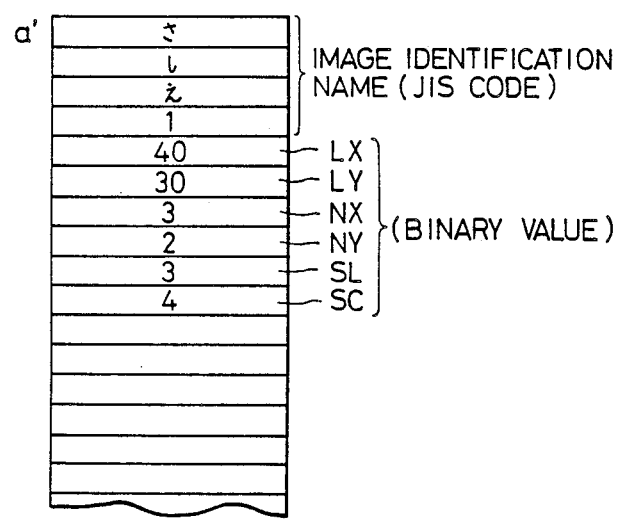
FIG. 12A is a schematic view showing an image buffer memory IBUF.
Figure 12B:
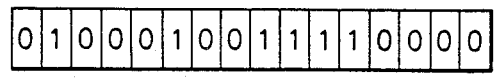
FIG. 12B is a schematic view showing the content of the buffer memory IBUF.

FIGS. 12A and 12B show the details of the image buffer memory IFUF1. As shown therein, first ten words of the buffer memory IFUF1 store information indicating the nature of the image. More specifically, the first four words store the identification name of the image in a Japanese Industrial Standard code, and the following two words store, in binary numbers, the number LX of dots in the horizontal direction and the number LY of dots in the vertical direction. Further following two words store the number NX of characters in the horizontal direction and the number NY of characters in the vertical direction, representing the dimension of image on the display screen in the units of characters. The following two words store values indicating the position, in the buffer memory, of the upper left end of the image, wherein SL represents the coordinate of the first row and SC represents the coordinate of the first character. The actual image data are stored from a word following the above-explained ten words. In the binary image, black and white are respectively represented by "1" and "0". FIG. 12B shows an example of such data storage.

Let us consider a case where the operator has entered characters "A", "B" and "C" in the above described embodiment, as shown in FIG. 13A. In this state, the JIS code "2341" for the character "A" can be displayed in the lower part of the display screen as shown in FIG. 13B, by moving the cursor CM to the position of the character "A" and depressing the code key CO. Also in case characters and an image are entered as shown in FIG. 14A, the identification name for the image can be displayed in the lower part of the display screen as shown in FIG. 14B by moving the cursor CM to the image area, represented by a hatched area therein, and depressing the code key CO.

In the following there will be given a detailed explanation on the procedure of the above-described function.

Figure 15:
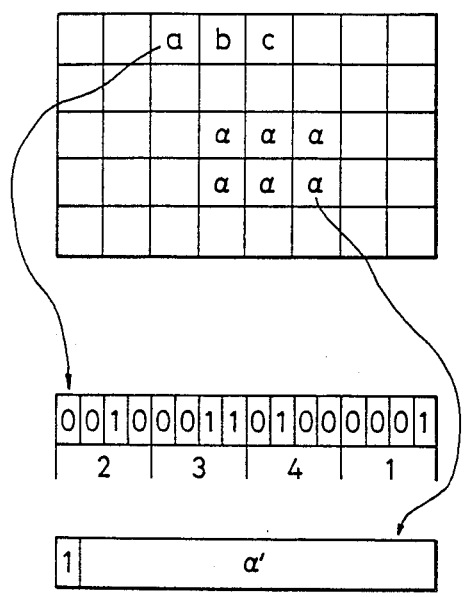
FIG. 15 is a schematic view showing the content of a buffer memory BUF.

After the entry of characters and an image as shown in FIG. 14A, the buffer memory BUF1 stores, as shown in FIG. 15, character codes (JIS codes) and an image code. In the codes of 16 bits, the first bit, as shown in FIG. 15, indicates whether the code represents an image or a character, respectively by "1" or "0". The remaining 15 bits of an image code indicates the first address in the image buffer memory IBUF. The buffer memory BUF stores same codes for images having a same identification name.

Figure 16:
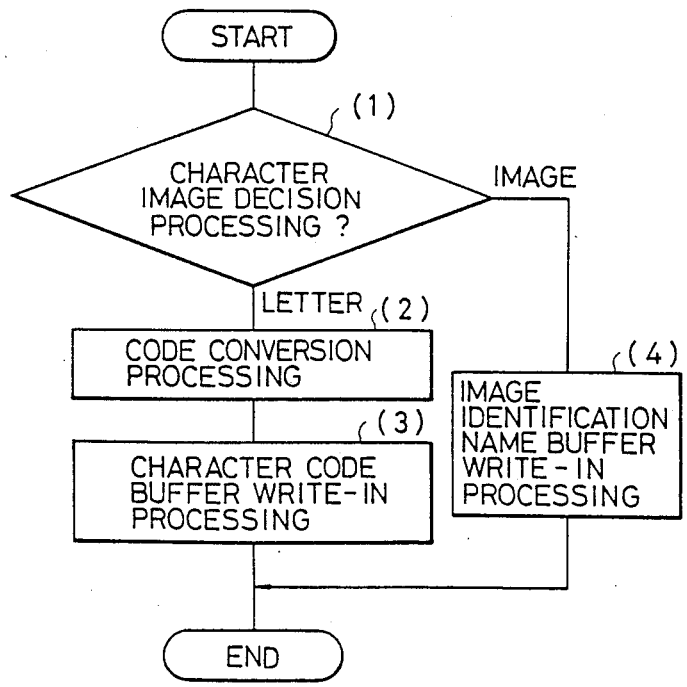
FIG. 16 is a flow chart showing the process flow for confirming character codes and image identification names.

Upon movement of the cursor CM to the desired position and actuation of the code cofirming key CO, there are executed following steps shown in FIG. 16;

(1) Character/Image discrimination step:

The step reads the content of the buffer memory BUF corresponding to a position indicated by the cursor, and the program proceeds to a step (2) or (4) respectively when the first bit is "0" or "1".

(2) Code conversion step:

This step takes out the 16-bit code in the buffer memory BUF corresponding to a position designated by the cursor in the step (1) and converts the code, 4 bits at a time, into the JIS code. As an example, for the JIS code "2341"$_H$ (H standing for hexadecimal notation) corresponding to the character "A", the numerals "2", "3", "4" and "1" are taken out in succession and are respectively converted into corresponding JIS codes "2332"$_H$, "2333"$_H$, "2334"$_H$ and "2331"$_H$. The conversion can be achieved by a table containing JIS codes "2330"$_H$-"2339"$_H$ and "2341"$_H$-"2346"$_H$ corresponding to "0"-"9" and "A"-"F".

(3) Character code buffer write-in step:

In this step, the code of 4 words obtained by conversion in the step (2) is recorded in successive areas B(5, 1)-B(5, 4) in the buffer memory BUF1.

(4) Image identification name buffer write-in step:

Data of 4 words, lead by the address represented by lower 15 bits of the 16-bit code in the buffer memory BUF1 corresponding to the position indicated in the step (1), are stored, in the original order, into areas B(5, 1)-B(5, 4) of the buffer memory BUF1.

In the following there will be explained still another embodiment of the present invention.

Figure 17:
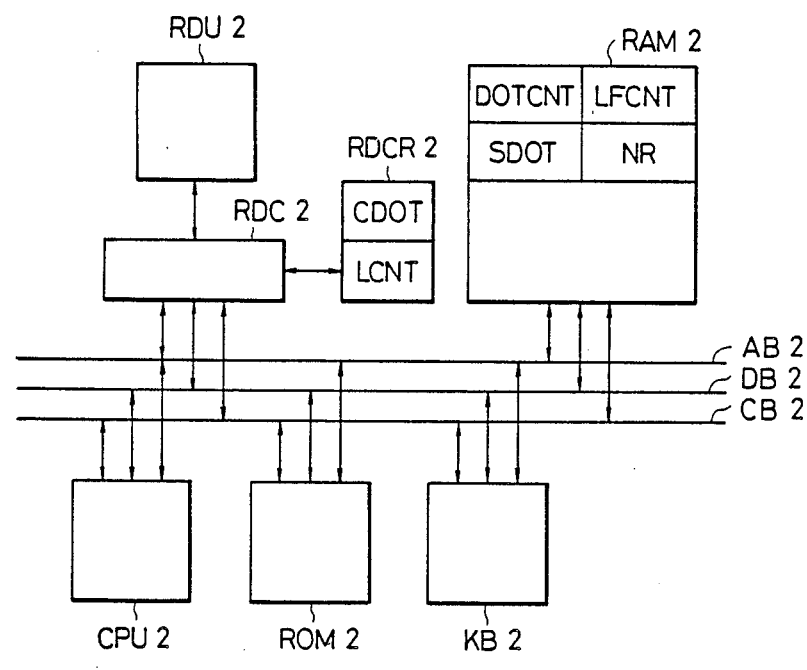
FIG. 17 is a block diagram showing still another embodiment of the present invention.

FIG. 17 shows an embodiment of an image reading apparatus of the present invention, wherein shown are a microprocessor CPU2 for arithmetic and logic calculations and for controlling buses AB2, CB2 and DB2 to be explained later; an address bus AB2 for transmitting signals for designating objects of control; a control bus CB2 for supplying control signals to various objects of control a data bus DB2 for transmitting and receiving various data; a control read-only memory ROM2 for storing programs of control for example programs shown in FIGS. 20 and 21, a random access memory RAM2 to be used for temporarily storing various data and as a working memory in the arithmetic and logic calculations in the microprocessor CPU2; and a keyboard KB2 for entering numerals and instructions to be read by the microprocessor CPU2.

Figure 18:
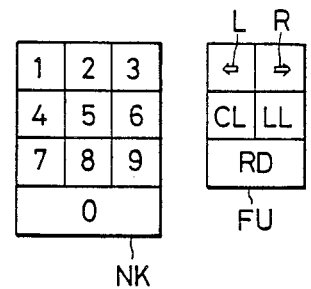
FIG. 18 is a schematic view showing key arrangement of a keyboard shown in FIG. 17.
Figure 19:
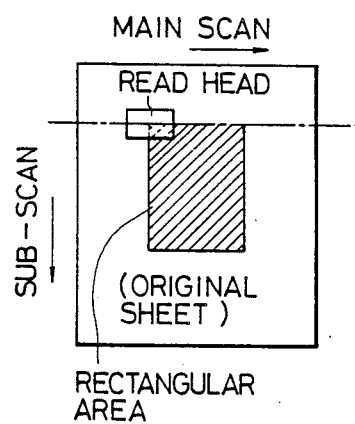
FIG. 19 is a schematic view showing an image reading unit and scanning directions therein.

As shown in FIG. 18, the keyboard KB2 is equipped with a numeral entering key group NK and function keys FU, which consists of keys L, R for moving the reading head toward left and right respectively, a key CL for designating the number of dots to be read in the main scanning direction, a key LL for designating the number of dots to be read in the subsidiary scanning direction, and a reading key RD.

The image reading unit RDU2 shown in FIG. 17 reads an image under the control of an image reading controller RDC2 to be explained later, and is composed of a lens, a lamp, an image sensor etc. which are already known for example in the facsimile technology and are therefore not explained in detail.

The image reading unit controller RDC2 executes the control process stored in the read-only memory ROM2 and transfers the image data read in the image reading unit RDU2 to the random access memory RAM2.

Registers RDCR2 are used by the image reading unit controller RDC2.

A register CDOT indicates the present position of the reading head, in terms of dots as the minimum units of movement, counted from the left end position as zero.

A register LCNT stores a value indicating the number of line feeds after the initialization. For the purpose of simplicity, the unit of line feed in the present embodiment is assumed to be equal to the length of the reading head in the subsidiary scanning direction.

A register DOTCNT in the random access memory RAM stores the length to be read in the main scanning direction, in terms of number of dots. If the operator's instruction is given for example in centimeters, the number of dots can be easily calculated from the ratio of dots/cm.

A register LFCNT stores the length to be read in the subsidiary scanning direction, in terms of number of line feeds. As explained above, if the instruction of operation is given for example in centimeters, the number of line feeds can be easily obtained from the ratio of main scanning lines/cm.

A register SDOT stores a number of dots indicating the start position of reading in the main scanning direction.

A numeral register NR stores the numeral codes entered from the keyboard KB in stack form.

Upon start of power supply in the above-described apparatus, the control procedure stored in the control memory ROM2 is sequentially executed to effect initialization, such as resetting of registers, movement of the reading head to a home position etc., thereby rendering possible the entry of instructions from the keyboard KB.

Then the operator sets an original document on the apparatus as shown in FIG. 11, moves the reading head to the upper left corner of a rectangular area to be read, by means of the leftward and rightward moving keys L, R, enters the length of the rectangular area in the main scanning direction with the numeral keys NK, and actuates the key CL to store thus entered value into the register. The length in the subsidiary scanning direction is similarly entered with the numeral keys NK and is stored in the register by the key CL.

Following the above-described procedure, the reading key RD is actuated to effect image reading in a desired rectangular area.

The above-described function and corresponding procedure will now be explained in more detail with reference to FIG. 20.

At first a step 4-1 effects the initialization step for moving the reading head to the home position, thus clearing the register CDOT, and also clearing the registers LCNT, DOTCNT; LFCNT, SDOP and NR. Subsequent to the initialization step, various steps are conducted in response to the inputs from the keyboard KB.

A step 4-5 for the input of the length in the main scanning direction converts the content of the numeral register NR into a binary number and then to a number of dots, stores the number into the register DOTCNT, and again clears the numeral counter NR. Upon completion of this step, the program awaits a succeeding key entry.

A step 4-7 for the input of the length in the subsidiary scanning direction converts the content of the numeral register NR into a binary number and then to a number of line feeds, stores ±he number into the register LFCNT, and again clears the numeral register NR.

A head shift step 4-9 discriminates the direction of head shift and sends an instruction to the RDC for moving the reading head by a dot either to left or to right, whereby the content of the register CDOT indicating the present position of the reading head is automatically amended.

Then the value stored in the register CDOT is transferred to the start position register SDOT to complete the procedure.

A numeral input step 4-11 stores, in stack form, the codes of numerals entered from the keyboard KB2 into the numeral register NR.

A read-out step 4-13 reads the image in the rectangular area determined in the foregoing procedure and stores the obtained data in the random access memory RAM2. After the completion of image reading, the program returns to the initialization step 4-1.

Figure 21:
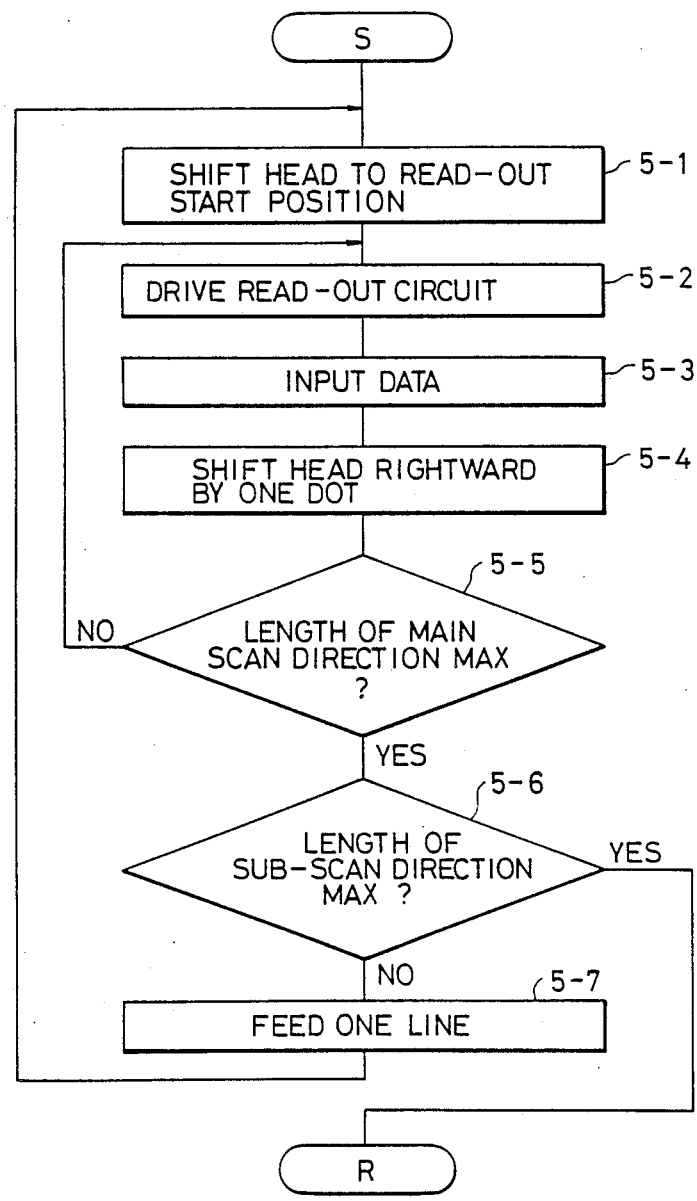
FIG. 21 is a flow chart showing the detailed process flow of image reading.

Now reference is made to FIG. 21 for giving further explanation on the image reading step 4-13.

A step 5-1 shifts the reading head to the start position by a rightward or leftward shift by a number of dots corresponding respectively to (SDOT−CDOT) or (CDOT−SDOT) if SDOT≧CDOT or SDOT<CDOT.

Succeeding steps 5-2 and 5-3 activate the reading circuit and store the obtained image data into the random access memory RAM2.

A step 5-4 shifts the reading head to the right by a dot.

A step 5-5 identifies whether the number of dots read in the main scanning direction has reached a predetermined number of dots, and the program proceeds to a step 5-6 or to a step 5-2 respectively when the result of the identification is affirmative or negative, namely when SDOT+DOTCNT≧CDOT or SDOT+DOTCNT<CDOT.

A step 5-6 identifies whether the number of line feeds in the subsidiary scanning direction has reached a predetermined number, and the image reading procedure is completed if the result of the identification is affirmative, while the program proceeds to a step 5-7 in case of a negative result. More specifically the image reading procedure is terminated in case CLNT+1≧LFCNT, and the program proceeds to the step 5-7 if LCNT+1<LFCNT.

The step 5-7 sends an instruction to the RDC2 for making a line feed. The content of the register LCNT is automatically increased by one, and the program thereafter returns to the step 5-1.

In the foregoing embodiment the length of the main scanning direction is designated by data entry from the keyboard KB2, but it is also possible to define an end position for image reading by moving the reading head in a similar manner as in the designation of the start position for image reading. In such case there is required an end point designating key in addition to a start point designating key.

In the following there will be explained still another embodiment of the present invention.

Figure 22:
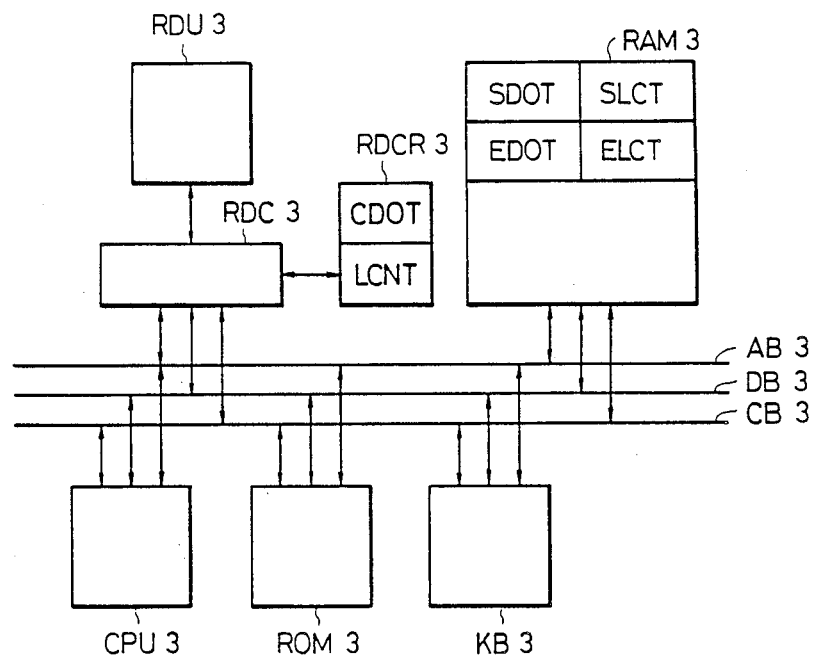
FIG. 22 is a block diagram showing still another embodiment of the present invention.
Figure 25:
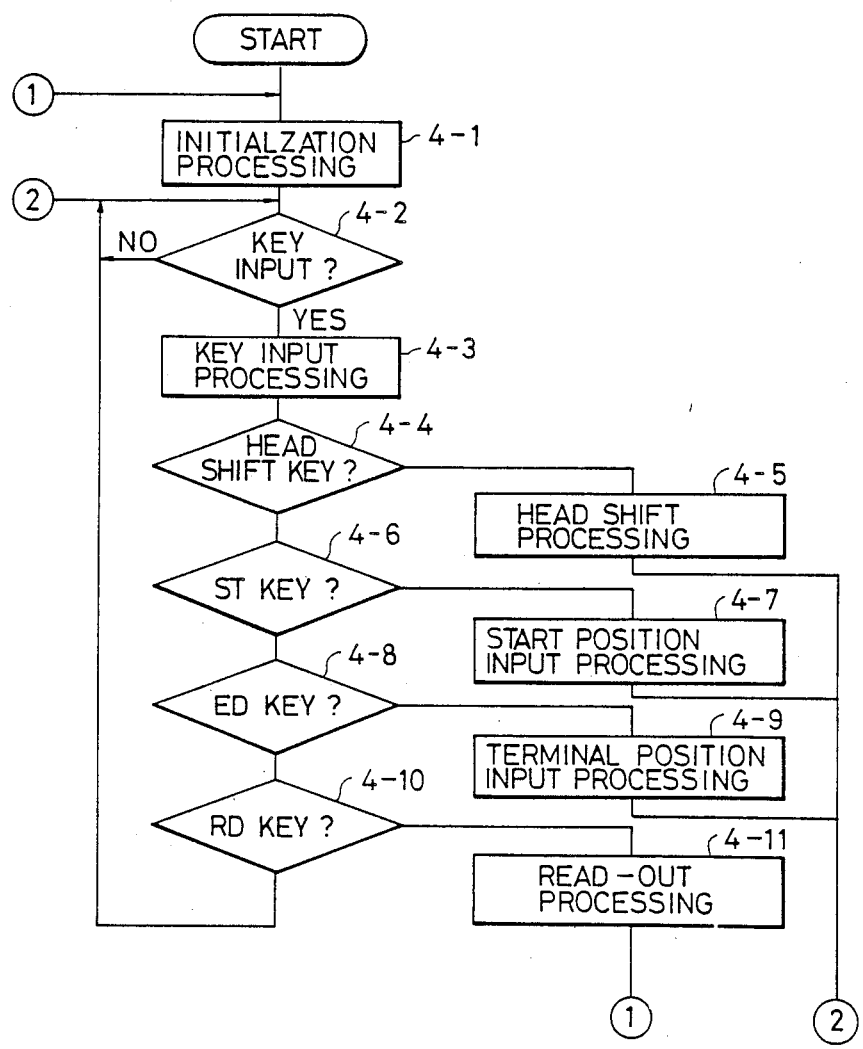
FIG. 25 is a flow chart showing the process flow in an image reading apparatus of the present invention.
Figure 26:
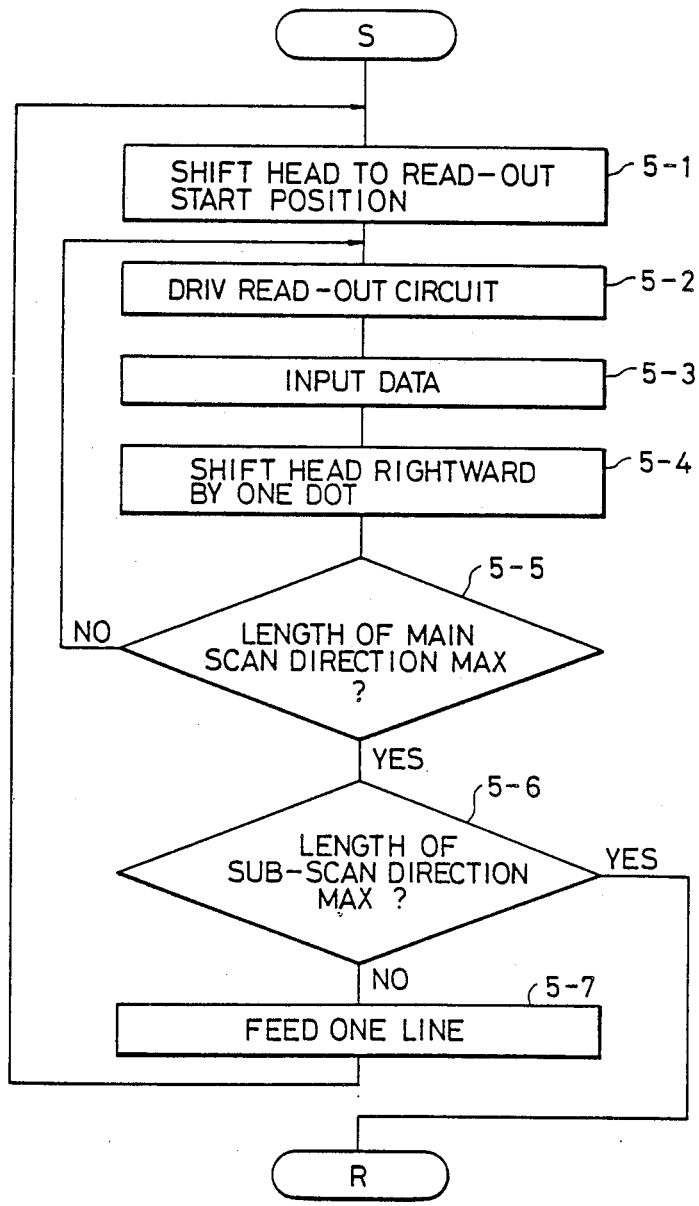
FIG. 26 is a flow chart showing the detailed process flow of image reading.

FIG. 22 shows an embodiment of a character process apparatus of the present invention, wherein shown are a microprocess or CPU3 for arithmetic and logic calculations and for controlling buses AB3, CB3 and DB3; an address bus AB3 for transmitting signals for designating objects of control; a control bus CB3 for supplying control signals to various objects of control; a data bus DB3 for transmitting and receiving various data; a control read-only memory ROM3 for storing programs of control for example programs shown in FIGS. 25 and 26; a random access memory RAM3 to be used for temporarily storing various data and as a working memory in arithmetic and logic calculations in the microprocessor CPU3; and a keyboard KB3 for entering numerals and instructions to be read by the microprocessor CPU3.

Figure 23:
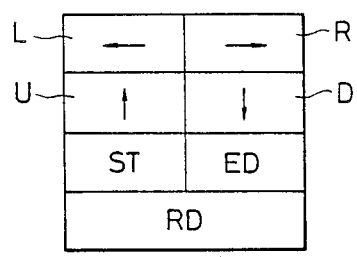
FIG. 23 is a schematic view showing key arrangement of a keyboard shown in FIG. 22.

FIG. 23 shows the details of the keyboard KB3 shown in FIG. 22. The keyboard KB3 is provided with keys L, R for moving the reading head toward left and right respectively, keys, U, D for moving the reading head upwards and downwards respectively, a reading start position designating key ST, a reading end position designating key ED and a reading key RD.

An image reading unit RDU3 shown in FIG. 22 reads an image under the control of an image reading controller RDC3 to be explained later, and is composed of a lens, a lamp, an image sensor etc. which are already known for example in the facsimile technology and are therefore not explained in detail.

An image reading unit controller RDC2 executes the control process stored in the read-only memory ROM3 and transfers the image data read in the image reading unit RDU3 to the random access memory RAM3.

Registers RDCR3 are used by the image reading unit controller RDC2.

A register CDOT indicates the present position of the reading head, in terms of dots as the minimum units of movement, counted from the left end position as zero.

A register LCNT stores a value indicating the number of line feeds after the initialization. For the purpose of simplicity, the unit of line feed in the present embodiment is assumed to be equal to the length of the reading head in the subsidiary scanning direction.

A register SDOT indicates the reading start position in the main scanning direction, with the original point and the unit same as those in the register CDOT.

A register EDOT indicates the reading end position in the main scanning direction, with the original point and the unit same as those in the register CDOT.

A register SLCT indicates the reading start position in the subsidiary scanning direction, with the original point and the unit same as those in the register LCNT.

A register ELCT indicates the reading end position in the subsidiary scanning direction, with the original point and the unit same as shown in the register LCNT.

In the present embodiment the head shift is controlled by the line feeding of the original document Thus, upon actuation of the upward or downward shift key U, D, the document respectively moves downward or upward.

Figure 24:
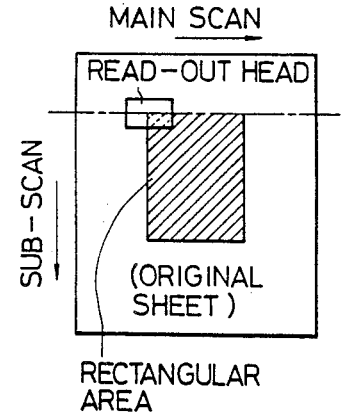
FIG. 24 is a schematic view showing an image reading unit and scanning directions therein.

Upon start of power supply in the above-described apparatus, the control program stored in the control memory ROM3 is sequentially executed to effect initialization, such as resetting of registers, movement of the reading head to a home position etc., thereby rendering possible the entry of instructions from the keyboard KB Then the operator sets an original document on the apparatus as shown in FIG. 24, and shifts the reading head to the upper left corner of a rectangular area to be read, by means of the leftward and rightward moving keys L, R and the upward and downward moving keys U, D.

Then the key ST is actuated to store the reading start position into the registers SDOT and SLCT. Subsequently the reading head is shifted to the lower right corner of the rectangular area by the head moving keys, and the key ST is actuated to store the reading end position into the registers EDOT and ELCT.

Following the above-described procedure the reading key RD is actuated to effect image reading in a desired rectangular area.

The above-described function and corresponding procedure will now be explained in more detail with reference to FIG. 25.

At first a step 4-1 effects the initialization step for moving the reading head to the home position, thus clearing the registers CDOT and LCNT, and also clearing the registers SDOT, EDOT, SLCT and ELCT.

Subsequent to the initialization step, various steps are conducted in response to the inputs from the keyboard KB3.

A head shift step 4-5 at first discriminates whether the required shift is in the horizontal or vertical direction, and, in case of the former, an instruction is supplied to the RDC3 for shifting the reading head by one dot either to left or to right. In response to the shift the content of the register CDOT indicating the present position of the head is automatically corrected.

In case of vertical shift, an instruction is supplied to the RDC3 for conducting a line feed by a line either upward or downward, respectively in response to the downward moving key D or upward moving key U. In response to the shift, the content of the register LCNT indicating the number of line feeds is automatically corrected.

A start position input step 4-7 records the present position of the reading head, by storing the contents of the registers CDOT, LCNT respectively in the registers SDOT and SLCT.

An end position input step 4-9 records the present position of the reading head, by storing the contents of the registers CDOT, LCNT respectively in the registers EDOT and ELCT.

A read-out step 4-11 reads the image in the rectangular area determined in the foregoing procedure and stores the obtained data in the random access memory RAM2. After the completion of image reading, the program returns to the initialization step 4-1.

Now reference is made to FIG. 26 for giving further explanation on the image read-out step 4-11.

A step 5-1 shifts the reading head to the start position by a rightward or leftward movement by a number of dots corresponding respectively to (SDOT−CDOT) or (CDOT−SDOT) if SDOT≧CDOT or SDOT<CDOT. Then the reading head is shifted to the reading start position by line feeds in the normal or inverse direction respectively by a number (LCNT−SLCT)or (SLCT−LCNT)if LCNT<SLCT or LCNT≧SLCT.

Succeeding steps 5-2 and 5-3 activate the reading circuit and store the obtained image data into the random access memory RAM3.

A step 5-4 shifts the reading head to the right by a dot, whereby the content of the register CDOT is automatically increased.

A step 5-5 identifies whether the reading head has reached the end position in the main scanning direction, and the program proceeds to a step 5-6 or 5-2 respectively when the result of the identification is affirmative or negative, namely when CDOT≧EDOT or CDOT<EDOT.

A step 5-6 identifies whether the reading head has reached the end position in the subsidiary scanning direction, and the image reading procedure is terminated if the result of the identification is affirmative, while the program proceeds to a step 5-7 in case of a negative result. More specifically the image reading procedure is terminated in case LCNT≧ELCT, and the program proceeds to the step 5-7 in case of LCNT<ELCT.

A step 5-7 sends an instruction to the RDC3 for making a line feed. The content of the register LCNT is automatically increased by one, and the program thereafter returns to the step 5-1.

In the foregoing embodiment the length of the main scanning direction is designated by data entry from the keyboard KB3, but it is also possible to define an end position for image reading by moving the reading head in a similar manner as in the designation of the reading start position. In such case there is required an end point designating key in addition to a start point designating key.

Also in the foregoing embodiment the main scanning is achieved by the shift of the reading head while the subsidiary scanning is achieved by the line feeding of the original document, a same effect can be attained by shifting the reading head also in the subsidiary scanning direction.

As explained in the foregoing, the present invention enables to obtain an image reading apparatus in which the operator can designate an image reading area on the original document in an extremely simple and precise manner.

What I claim is:

1. An image reading apparatus comprising:
   a reading head for reading an image;
   first instruction means for instructing relative movement of said reading head and the image in a predetermined direction to a desired position of said reading head with respect to the image in response to the input of instructions from an operator;
   shifting means for shifting said reading head and the image with respect to each other in the direction instructed by said first instruction means to the desired position of said reading head with respect to the image without reading the image;
   second instruction means for, after said reading head and the image are shifted with respect to each other and said reading head is positioned at the desired position with respect to the image without reading the image, instructing the desired position to be stored;
   memory means for storing the position of said reading head with respect to the image instructed to be stored by said second instruction means; and
   control means for controlling the reading of the image at least in part by shifting of said reading head and the image with respect to each other utilizing the position stored in said memory means as an end point of an area of the image to be read by said reading head.

2. An image reading apparatus according to claim 1, wherein said reading head comprises an optical reading member.

3. An image reading apparatus according to claim 1, wherein said memory means comprises a plurality of registers which store their respective different end points.

4. An image reading apparatus according to claim 1, wherein said shifting means shifts said reading head in the direction instructed by said first instruction means so that said reading head is positioned to the desired position without reading the image, and wherein said control means controls said reading head to shift said reading head utilizing the position stored in said memory means as an end point of an area of the image to be read by said reading head.

5. An image reading apparatus according to claim 1, wherein said shifting means shifts the image in accordance with instructions from said first instruction means so that said reading head is positioned to the desired position with respect to the image without reading the image, and wherein said control means controls said image to shift said image utilizing the position stored in said memory means as an end point of an area of the image to be read by said reading head.

* * * * *

UNITED STATES PATENT AND TRADEMARK OFFICE
CERTIFICATE OF CORRECTION

PATENT NO. : 4,963,996

DATED : October 16, 1990

INVENTOR(S) : Yuichi Bannai

It is certified that error appears in the above-identified patent and that said Letters Patent is hereby corrected as shown below:

FIG. 10:

"CB" should read "CB1".

COLUMN 1:

Line 22, "400 and 800 sections" should read
      --400 by 800 sections--.

COLUMN 2:

Line 1, "still possibil-" should read "still
     the possibil- --.

Line 27, "scanning at" should read --scanning for--.

Line 29, "end points" should read --the end points--.

COLUMN 3:

Line 36, "clarified" should read --explained--.

Line 54, "detailed" should read --details--.

Line 57, "I" should be deleted.

UNITED STATES PATENT AND TRADEMARK OFFICE
CERTIFICATE OF CORRECTION

PATENT NO. : 4,963,996

DATED : October 16, 1990

INVENTOR(S) : Yuichi Bannai

It is certified that error appears in the above-identified patent and that said Letters Patent is hereby corrected as shown below:

COLUMN 3 (continued):

Line 63, "cursor register CR1" should read --cursor register CR--.

COLUMN 4:

Line 8, "character generator CG1" should read --character generator CG--.

Line 35, "Y32 1 ~ 16" should read --Y=1~16--.

Line 37, "line constitutes" should read --lines constitute--.

Line 38, "column" should read --column.--.

Line 47, "white" should read --white portions--.

Line 59, "area" should read --areas--.

UNITED STATES PATENT AND TRADEMARK OFFICE
CERTIFICATE OF CORRECTION

PATENT NO. : 4,963,996

DATED : October 16, 1990

INVENTOR(S) : Yuichi Bannai

It is certified that error appears in the above-identified patent and that said Letters Patent is hereby corrected as shown below:

COLUMN 5:

Line 3, "enter" should read --entry--.

Line 43, "transfer" should read --transfers--.

Line 53, "transfer" should read --transfers--.

Line 60, "register m and 1" should read
--registers m and 1--.

COLUMN 7:

Line 8, "buffer memory FUF1" should read --buffer memory BUFI--.

Line 13, "buffer memory FUF1" should read --buffer memory BUF1--.

UNITED STATES PATENT AND TRADEMARK OFFICE
CERTIFICATE OF CORRECTION

PATENT NO. : 4,963,996
DATED : October 16, 1990
INVENTOR(S) : Yuichi Bannai

It is certified that error appears in the above-identified patent and that said Letters Patent is hereby corrected as shown below:

COLUMN 7 (continued):

Line 14, "14)." should read --14A).--.

Line 24, "area IFUF1" should read --area IBUF1--.

Line 26, "buffer memory IFUF1." should read --buffer memory IBUF1.--.

Line 27, "buffer memory IFUF1" should read --buffer memory IBUF1--.

Line 48, "above described" should read --above-described--.

COLUMN 8:

Line 1, "indicates" should read --indicate--.

Line 45, "control a" should read --control; a--.

Line 48, "21, a" should read --21; a--.

UNITED STATES PATENT AND TRADEMARK OFFICE
CERTIFICATE OF CORRECTION

PATENT NO. : 4,963,996
DATED : October 16, 1990
INVENTOR(S) : Yuichi Bannai

It is certified that error appears in the above-identified patent and that said Letters Patent is hereby corrected as shown below:

COLUMN 9:

Line 59, "DOTCNT;" should read --DOTCNT,--; and "SDOP" should read --SDOT--.

COLUMN 10:

Line 4, "±he" should read --the--.

Line 48, "CLNT + 1 ≥ LFCNT," should read --LCNT + 1 ≥ LFCNT,--.

Line 67, "microprocess or CPU3" should read --microprocessor CPU3--.

UNITED STATES PATENT AND TRADEMARK OFFICE
CERTIFICATE OF CORRECTION

PATENT NO. : 4,963,996

DATED : October 16, 1990

INVENTOR(S) : Yuichi Bannai

It is certified that error appears in the above-identified patent and that said Letters Patent is hereby corrected as shown below:

COLUMN 11:

Line 26, "image reading unit controller RDC2" should read --image reading unit controller RDC3--.

Line 31, "controller RDC2." should read --controller RDC3.--.

Line 55, "downward or up-/ward" should read --upward or downward.--

COLUMN 13:

Line 22, "Also" should read --Although--.

Signed and Sealed this

Fourth Day of August, 1992

Attest:

DOUGLAS B. COMER

Attesting Officer

Acting Commissioner of Patents and Trademarks